United States Patent [19]

Scully

[11] Patent Number: 4,582,107
[45] Date of Patent: Apr. 15, 1986

[54] VEHICLE TIRE INFLATION-DEFLATION MECHANISM

[75] Inventor: Andrew J. Scully, Mt. Clemens, Mich.

[73] Assignee: The United States of America as represented by the Secretary of the Army, Washington, D.C.

[21] Appl. No.: 634,856

[22] Filed: Jul. 26, 1984

[51] Int. Cl.⁴ ............................................. B60C 23/00
[52] U.S. Cl. ..................................... 152/417; 152/415; 301/5 VH; 301/124 R
[58] Field of Search ....................... 152/415, 416, 417; 301/5 VH, 124 R, 124 H, 131

[56] References Cited

U.S. PATENT DOCUMENTS

| | | | |
|---|---|---|---|
| 839,626 | 12/1906 | Nielsen | 152/417 |
| 1,112,596 | 10/1914 | Burggraf, Jr. | |
| 1,657,023 | 6/1926 | Mitchell et al. | |
| 1,800,780 | 4/1931 | Daneel | 152/417 |
| 2,976,906 | 3/1961 | Kamm et al. | 152/417 |
| 2,989,999 | 5/1961 | Holbrook et al. | |
| 3,102,573 | 3/1963 | Van Winsen et al. | |
| 4,431,043 | 2/1984 | Goodell et al. | |
| 4,434,833 | 3/1984 | Swanson et al. | |
| 4,470,506 | 9/1984 | Goodell et al. | 152/417 |

FOREIGN PATENT DOCUMENTS 117696  7/1958  U.S.S.R. ............................ 152/417

Primary Examiner—Lois E. Boland
Attorney, Agent, or Firm—Peter A. Taucher; John E. McRae; Robert P. Gibson

[57] ABSTRACT

A compressed air passage system carried by an axle on a road vehicle for transferring compressed air from/to a central air pressure source to/from the associated vehicle wheel. The passage system comprises a specially-constructed duct installable in a clearance space between the axle housing and axle; an air transfer slip ring mechanism is arranged at the outer end of the duct to transfer compressed air across the interface between the non-rotating and rotating parts of the axle assembly. The system is specially designed to permit the air passage system to be added to a pre-existing axle construction with minimum modification of existing components.

2 Claims, 5 Drawing Figures

VEHICLE TIRE INFLATION-DEFLATION MECHANISM

GOVERNMENT INTEREST

The invention described herein may be manufactured, used, and licensed by or for the Government for governmental purposes without payment to me of any royalty thereon.

BACKGROUND AND SUMMARY OF THE INVENTION

The present invention relates to a device for inflating and deflating vehicle tires whether the vehicle is moving or standing still. Some devices of this general character have been designed; however, most of them require that the device be integrated into the original vehicle design. They do not contemplate being easily retrofitted into existing vehicles. The present invention contemplates structural modifications on an existing vehicle to give the existing vehicle the capability of inflating and deflating the tires while the vehicle is at rest or moving.

Having the capability to increase or decrease the tire pressure while the vehicle is moving is desirable because it allows the driver to increase or decrease the amount of surface traction the tires have as the terrain or conditions warrant. When a vehicle is traveling over hard terrain it is desirable to have a relatively low tire surface area to reduce wear on the tire and decrease the vehicle tire rolling resistance. However, when the vehicle is traveling on soft terrain greater traction is needed. The traction of the tire is increased by reducing its air pressure. As the tire is deflated, the surface area in contact with the ground increases, as does the traction of the vehicle.

A tire inflation-deflation system is also useful when the terrain or conditions remain constant but the payload weight changes. When the vehicle payload is increased, more force is exerted on the tire. To keep the traction mated to the terrain the tire pressure must be increased; conversely, as the payload is reduced the tire should be deflated if the traction is to remain at an optimum.

The following U.S. Patents are believed to be representative of air inflation-deflation systems heretofore used and/or proposed for use on vehicles:

Burggraf 1,112,596
Mitchell 1,657,023
Holbrook 2,989,999
VanWinsen 3,102,573
Goodell 4,431,043
Swanson 4,434,833

The prior art patented disclosure most pertinent to my invention is believed to be the disclosure embodied in U.S. Pat. No. 4,431,043. My invention is believed to represent an advance over that patent disclosure in that my system is more easily and more economically added to existing vehicles. Additionally, my add-on system is believed to have advantages as regards easier (less costly) maintenance of certain slip ring air seals required in such systems.

My invention is directed particularly to an add-on passage system installable on the rear axle assembly of an existing military vehicle to provide the vehicle with central tire pressure inflation-deflation capability. The principle object of the invention is to provide an add-on air passage system that can be economically installed and maintained.

THE DRAWINGS

FIG. 2 shows my improved air passage system added into the rear axle assembly.

Figure 1:
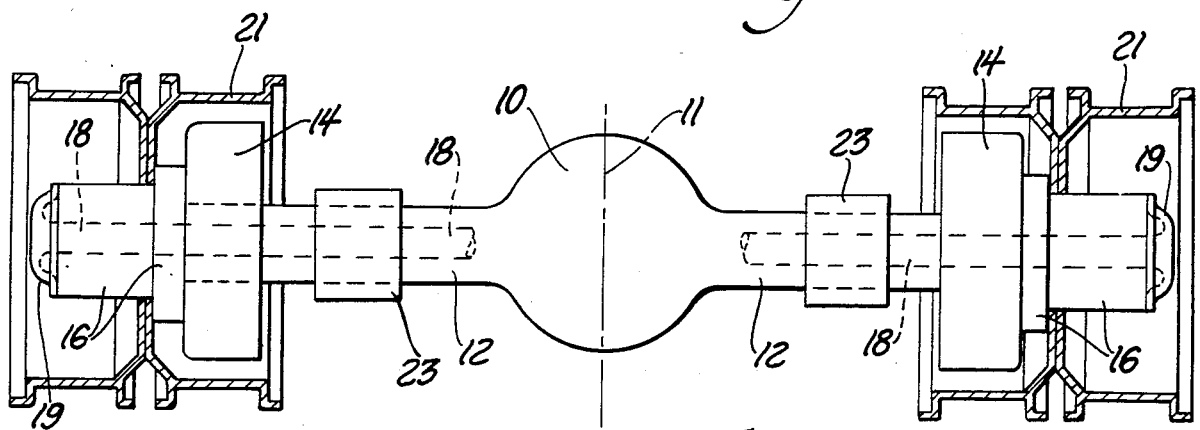
FIG. 1 is a top plan view of a vehicle rear axle assembly suited to use my invention.

FIG. 1 is a plan view of a vehicle rear axle assembly suited to use my invention. The assembly comprises principally a differential housing 10 on the longitudinal centerline 11 of the vehicle, two hollow axle housing structures 12 extending laterally from housing 10, two brake drums 14 carried on wheel hub structures 16, and two axle shafts 18 extending within housing structures 12. The outer end of each shaft 18 is flanged, as at 19, to connect with the associated hub structure 16. Each sub-assembly comprised of shaft 18, hub structure 16 and brake drum 14, rotates as a single unit. Conventional wheels 21 are bolted onto each hub structure 16. The inner end of each axle shaft 18 has a splined connection with a side gear in the differential gear set (within housing 10). Suspension spring saddles 23 are bolted to axle housings 12 inboard from brake drums 14. FIG. 1 illustrates features of an existing rear axle assembly for a truck used by the U.S. Military.

Figure 2:
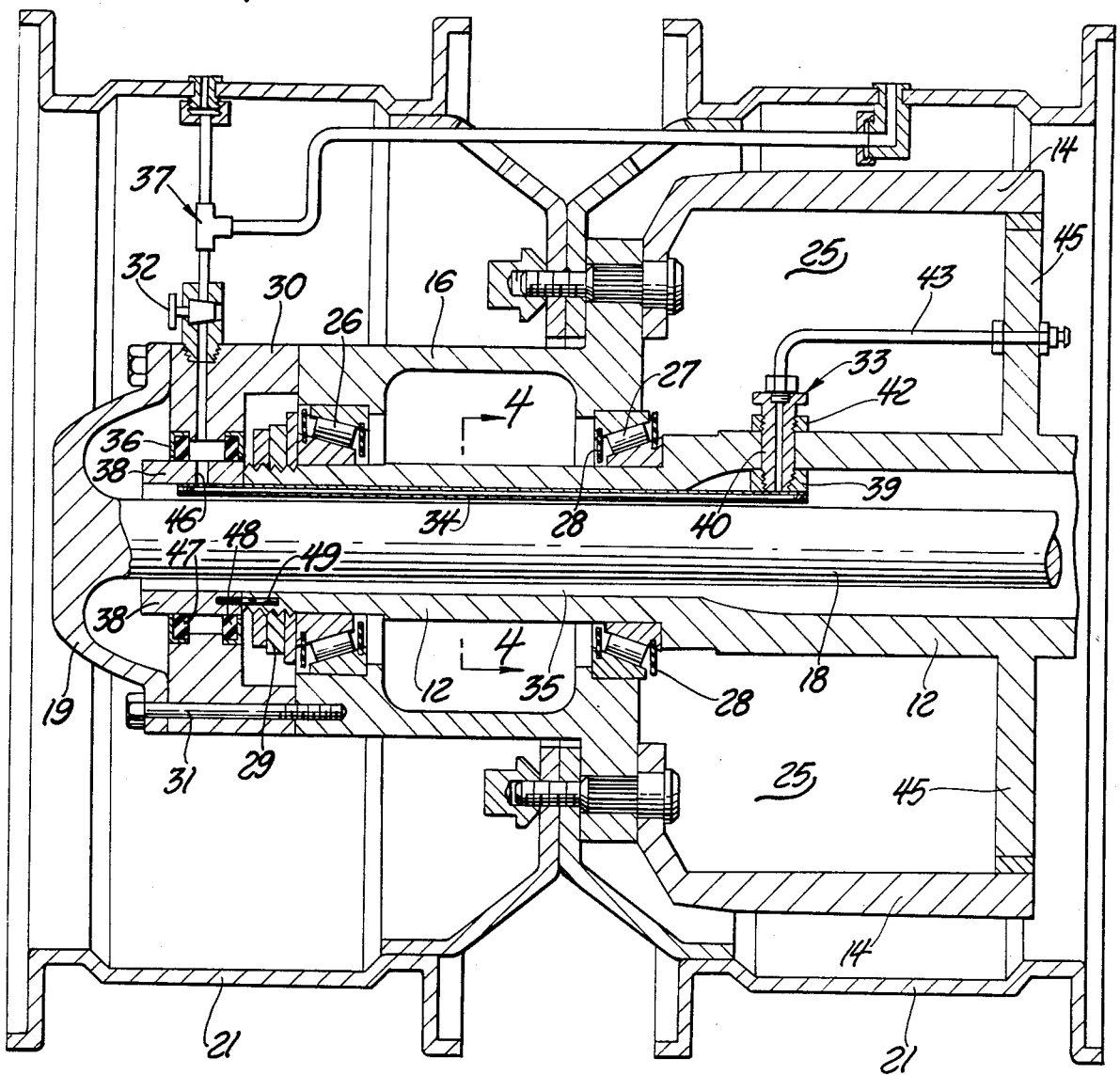
FIG. 2 is an enlarged fragmentary sectional view illustrating part of the FIG. 1 assembly.

FIG. 2 illustrates in greater detail an outboard section of the axle assembly shown in FIG. 1; the other outboard section would be a mirror image of the section shown in FIG. 2. Braking components are not illustrated in FIG. 2; they would be disposed in annular space 25 within drum 14.

The conventional wheel—support hub structure 16 is supported for rotary motion on housing 12 by means of conventional anti-friction bearings 26 and 27. Both the outboard bearing 26 and the inboard bearing 27 may be provided with annular sealing flaps 28 for retention of grease or similar lubricant in contact with the anti-friction elements in the individual bearings. Suitable nut-washer mechanisms 29 are applied onto the threaded outboard end of axle housing 12 to maintain the hub-axle housing assembly in an operative condition.

Axle 18 extends within housing 16 from the differential 10 (FIG. 1) to a point beyond the outboard bearing 26. The outer end of axle 18 defines a flange 19. Annular connector wall means 30 is interposed between flange 19 and the outer end face of wheel hub 16. Six or more bolts 31 are trained through aligned holes in elements 19, 30 and 16 to rigidly join axle 18 and hub 16 for conjoint rotation. Wall means 30 constitutes part of hub structure 16 when bolts 31 are in place.

Figure 4:
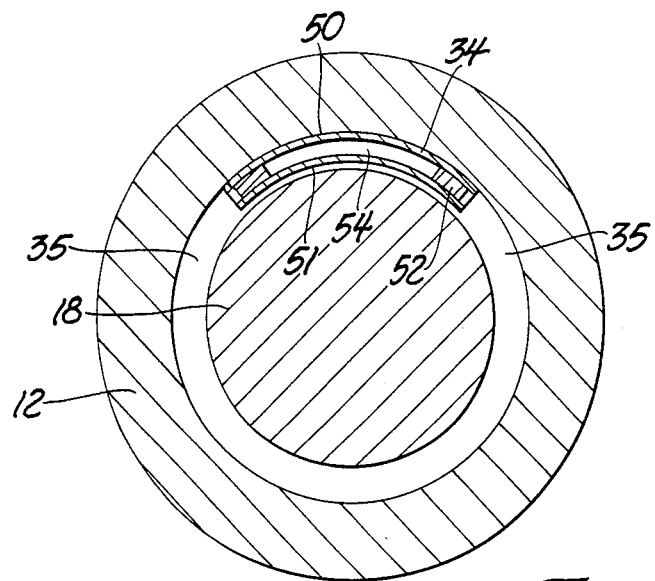
FIG. 4 is a sectional view taken on line 4—4 in FIG. 2.

My invention is especially concerned with an add-on air passage means for directing compressed air to/from a central compressed air source (not shown) and the individual wheel units 21. As shown in FIG. 2, the novel air passage means comprises an elongated air duct 34 extending within and along the clearance space 35 between axle housing 12 and axle 18, said duct having an inner end located inboard from the general plane of bearings 26 and 27, and an outer end located outboard from the general plane of said bearings. FIG. 4 illustrates the general cross section of duct 34 (somewhat enlarged from the scale used in FIG. 2).

As best seen in FIG. 2, air duct 34 is connected at its inner end to axle housing 12 by means of a fitting 33. The outer end of duct 34 is welded or otherwise affixed to an annular wall 38 at the outer end of housing 12.

The novel air passage means further comprises an air-transfer slip-ring mechanism 36 trained between wall 38 and the aforementioned connector wall 30. A suitable manual shut-off valve 32 and tubing 37 are provided between wall 30 and the individual wheel units 21.

Figure 3:
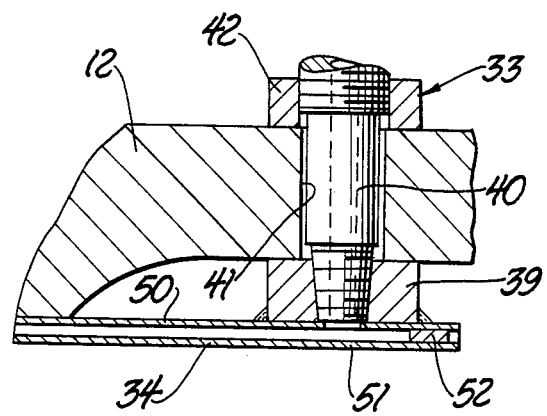
FIGS. 3 and 5 are fragmentary sectional views of structural details used in the FIG. 2 system.

The aforementioned fitting 33 may be varied as to specific design detail. As seen in FIG. 3, the fitting comprises an internally threaded block or nut 39 affixed to the end of duct 34, as by welding. An externally threaded tubular element 40 is extended through a drilled hole 41 in the wall of axle housing 12 to thread into the block 39 threads. Block 39 has a thickness proportional to diameter dimensional differences at points along the inner surface of housing 12, such that block 39 is able to accurately position duct 34 closely against the inner surface of housing 12, as shown in FIG. 4. Block 39 constitutes a spacer between duct 34 and the housing 12 wall.

A nut 42 is threaded onto element 40 to clamp the fitting in place. As seen in FIG. 2, the fitting has a connection with conventional tubing 43 that leads through dust shield 45 carried on housing 12. Other tubing, not shown, connects back to the air compressor (central air pressure source). Tubular element 40 is designed to transfer compressed air between tubing 43 and duct 34.

Figure 5:
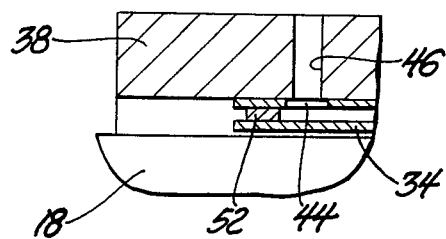

FIG. 5 illustrates the general nature of the connection between the outer end of duct 34 and annular wall 38. A hole 44 is formed in the duct wall to align with a hole 46 formed through wall 38. A welding operation is carried out so that a sealed connection is formed around hole 44.

The aforementioned slip ring mechanism 36 is defined by two generally conventional seal units 47 and 48 suitably affixed to annular connector wall 30, as by means of press fits in counterbores in face areas of the wall. Each seal unit comprises a metal rim and elastomeric seal element.

Air duct 34 can be formed in any suitable manner, the essential requirements being that it fit within clearance space 35 (FIG. 4), and that it have sufficient duct area to permit the deflation - inflation processes to be carried out within a reasonably short time interval.

In the typical situation (actual truck axle assembly) clearance space 35 is about one quarter inch in the radial direction; the duct must be no thicker (radially) than about 0.2 inch. As seen in FIG. 4, duct 34 is comprised of two arcuate sheets 50 and 51, and intervening perimeter sheet 52. Sheet 52 is of picture-frame character for encompassing a central air space 54. Space 54 constitutes the air passage. The sheets are welded together along their outer edges. The defined duct has a relatively small cross section in the radial dimension, but a relatively large dimension in the circumferential direction, whereby the duct is able to adequately handle the volumetric air flow requirements. Preferably the duct circumferential dimension is at least ten times the duct radial dimension. In the extreme the duct could extend around the entire circumferential space 35; the duct in that case would have an annular cross section.

Air duct 34 is formed separately from axle housing 12. Installation of the air duct 34 is accomplished with axle shaft 18 removed from housing 12. With nut 39 already welded onto one end of duct 34, and with wall 38 welded onto the other end of duct 34, the assembly can be slid into housing 12. With nut 39 properly oriented to hole 41, the tubular element 40 can be extended through hole 41 to clamp the inner end of the duct to housing 12. Annular wall 38 will abut the end surface of housing 12; aligner pins 49 (FIG. 2) can be used to preclude radial dislocation of wall 38.

Annular connector wall 30 can be slipped over wall 38, after which the axle can be reinstalled into housing 12; bolts 19 are used to interconnect axle 18, wall 30, and hub structure 16.

The advantage of the illustrated arrangement is that minimum modification of the existing axle assembly is required to provide the compressed air inflation-deflation capability. The add-on components are duct 34, fitting 33, annular wall 38 and hub component 30. Modification of the pre-existing axle assembly consist in drilling hole 41. The required modification is relatively minor in nature.

The presently proposed air inflation-deflation mechanism is viewed as a cost reduction alternative to the system shown in aforementioned U.S. Pat. No. 4,131,043. Cost reduction is considered to reside from a minimum (hopefully zero) scrap rate using my approach. The arrangement of U.S. Pat. No. 4,131,043 is believed to have an inherently high scrap rate due to the fact that the air passage includes a relatively long drilled hole in the axle housing; e.g. note passage 66 in the drawing of the referenced patent. In practice the drilled hole would have a diameter of about one-quarter inch and a length of about ten inches; the axle housing has a wall thickness of about one half inch. Error in selecting the drill entry point, coupled with error in the direction taken by the drill could cause the drill to poke through the inner or outer surface of the axle housing; a directional error of as little as one degree (in the radial direction) could produce the undesired result. With the arrangement of U.S. Pat. No. 4,131,043 there may also be a problem in precisely aligning the drilled passages 66 and 70.

My proposed arrangement is also believed to be advantageous as regards easier maintenance of the slip ring seals; these seals (47 and 48) are readily accessible without disconnecting the hub structure or disturbing the anti-friction bearings. In the arrangement of U.S. Pat. No. 4,431,043 the air seals are accessible only after the hub structure is removed; the bearings must be removed, reinstalled and possibly repacked. Maintenance operations are somewhat more complex and somewhat more costly with the system of U.S. Pat. No. 4,431,043.

I wish it to be understood that I do not desire to be limited to the exact details of construction shown and described for obvious modifications will occur to a person skilled in the art, without departing from the spirit and scope of the appended claims.

I claim:

1. In a vehicle that includes a tubular axle housing, a wheel support hub structure surrounding said housing, bearings trained between the housing and hub structure enabling said hub structure to rotate on the housing, a rotary axle extending within the housing to a point therebeyond, and means external to said housing connecting the axle and the wheel hub structure for conjoint rotation; the improvement comprising compressed air passage means for supplying compressed air to the wheel supported on the hub structure; said air passage means comprising:
  a. an elongated duct extending within and along the clearance space between the axle housing and axle, said duct having an outer arcuate surface contour conforming to the surface curvatures on the axis housing and axle;
  b. said duct having an inner end located inboard from the general plane of the aforementioned bearings and an outer end located outboard from the general plane of said bearings;
  c. an air transfer slip ring mechanism comprising an annular wall (38) connected to the outer end of said duct, and axially spaced slip ring air seals arranged between said annular wall and an inner surface of the hub structure, said slip ring trained between an outer end portion of the elongated duct and the hub structure; said slip ring mechanism being disposed outboard from the aforementioned bearings whereby the slip ring mechanism can be removed without disturbing said bearings;
  d. means for detachably connecting the aforementioned duct to the axle housing comprising a clamp means, and a pin means (49) trained between the aforementioned annular wall and the outer end of the axle housing; said clamp means comprising a spacer block affixed to the inner end of the duct, and a tubular element (40) extendable through a hole in the axle housing wall, said rubular element and spacer block having interengaged threads enabling the duct to be drawn against the inner surface of the axle housing; said tubular clamp element defining an air conduit operable to transmit compressed air between the external zone surrounding the axle housing to the duct, whereby said air passage means transmits compressed air from an external zone to a wheel independent of any components of the axle, axle housing, and hub structure.

2. The improvement of claim 1 and further comprising aligned air transfer holes formed in the outer end of the duct and said annular wall; said aligned holes communicating with the space formed between the slip ring air seals.

* * * * *